United States Patent [19]

Schulz

[11] Patent Number: 4,733,116

[45] Date of Patent: Mar. 22, 1988

[54] ANGLE SENSOR WITH REDUCTION GEAR

[75] Inventor: Klaus Schulz, Berlin, Fed. Rep. of Germany

[73] Assignee: Oelsch Kommanditgesellschaft, Berlin, Fed. Rep. of Germany

[21] Appl. No.: 892,175

[22] PCT Filed: Dec. 7, 1985

[86] PCT No.: PCT/EP85/00684

§ 371 Date: Oct. 14, 1986

§ 102(e) Date: Oct. 14, 1986

[87] PCT Pub. No.: WO86/03580

PCT Pub. Date: Jun. 19, 1986

[30] Foreign Application Priority Data

Dec. 12, 1984 [DE] Fed. Rep. of Germany ....... 3445243

[51] Int. Cl.4 .................... H02K 11/00; G01B 7/30; G01D 5/04
[52] U.S. Cl. .................... 310/68 B; 310/83; 310/171; 340/347 P
[58] Field of Search .................... 310/67 R, 68 R, 83, 310/265, 268, 171; 340/347 P

[56] References Cited

U.S. PATENT DOCUMENTS 3,253,260 5/1966 Hawley .................... 340/151
3,679,922 7/1972 Rahn .................... 310/89
3,772,675 11/1973 Bose et al. .................... 340/347 P

FOREIGN PATENT DOCUMENTS 3212149 10/1983 Fed. Rep. of Germany .
2337045 7/1977 France .
175028 12/1980 Japan .

Primary Examiner—Patrick R. Salce
Assistant Examiner—D. L. Rebsch
Attorney, Agent, or Firm—Lee, Smith & Zickert

[57] ABSTRACT

In a flat housing (10) a stator (12) is concentrically arranged relative to an input shaft (16) supported in the housing (10). A rotor (14) is seated on the input shaft (16). A reducing gear (18) constructed as a play-free planetary gear is arranged within the flat housing (10) in an annular space (20) formed between the rotor (14) and the input shaft (16). The signal processing circuit is also accommodated in an annular space (60) within the housing (10). The input shaft (16) can be rotated through 360° or more. During such rotation, the rotor (14) performs a rotational movement through a limited angle within which there is obtained a substantially linear angle signal due to the cooperation of the rotor (14) and the stator (12).

8 Claims, 3 Drawing Figures

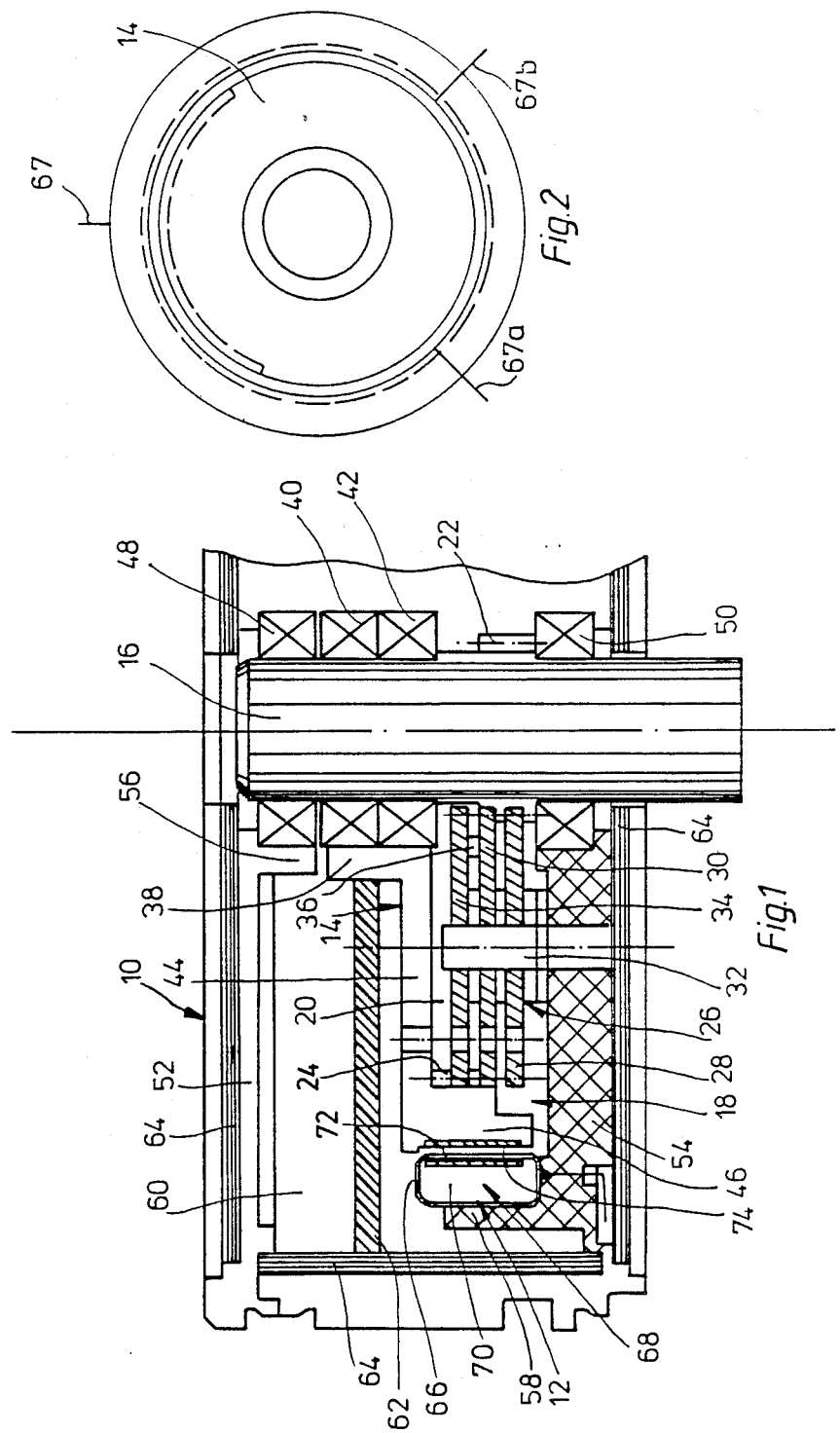

ANGLE SENSOR WITH REDUCTION GEAR

TECHNICAL FIELD

The invention relates to an angle transmitter containing (a) a flat housing,
(b) a stator arranged in the flat housing,
(c) a rotor rotatably supported relative to the stator in the housing and cooperating with the stator through a limited angular range for producing an output signal dependent upon the rotational angle,
(d) an input shaft and
(e) a reducing gear by means of which the input shaft is coupled to the rotor.

BACKGROUND ART

German Patent Publication No. 3,212,149 describes an angle transmitter in which the stator contains a coil wound along a circular arc and containing a central tap. The coil is seated upon an annular core made of non-magnetic material and having substantially rectangular cross-section. Strips of magnetic material are inserted into the interior surface and into the exterior surface of the annular core. This stator is seated in a flat box-shaped housing. The rotor is journalled in the housing by means of a shaft. The rotor is constructed as a rotary member containing a disc and two coaxial ribs extending along the circumference of the disc. The ribs extend internally and externally around the coil. The rotor is manufactured from non-magnetic material. Strips of ferromagnetic material are sunk into the outer side of the inner rib, into the inner side of the outer rib, which sides face the coil. These strips extend over part of the circumference. The ferromagnetic strips affect the stray field and effect a change in the inductances of the coil portions on both sides of the central tap when the rotor is rotated. A circuit arrangement responds to these changes for generating an angle signal. In the known angle transmitter the rotor can be rotated through full circle. However, an angle signal which is proportional to the rotational angle, can be obtained only through a limited angular range of, for example, 90°.

For this reason the known angle transmitter has been provided with a reducing gear. An input shaft is coupled to the rotor via such reducing gear. Therein the input shaft jointly with the reducing gear is seated in a separate housing which is attached to the recited flat housing according to German Patent Publication No. 3,212,149. The output shaft of this gear is coupled to the shaft which carries the rotor. The input shaft, then, can be rotated through 360° or, if required, even through a greater angle, whereas the rotor moves within the range in which a linear angle signal is obtained. The circuit arrangement which responds to changes in the inductances of the two coil portions for generating the angle signal is also accommodated in a separate housing, which is attached to the flat housing of the actual angle transmitter in a practically realized known arrangement of the type according to German Patent Publication No. 3,212,149.

Thus, for the overall arrangement, there result relatively great axial dimensions which are undesired for many uses.

The same problem also occurs in angle transmitters operating according to a different principle, for example, in angle transmitters in which an armature which contains a core of low-retentivity material, more or less widely extends into arcuately wound coil portions and the core is moved farther into the one coil half and correspondingly farther out from the other coil half when the armature is rotatably moved out from a central position.

German Patent Publication No. 3,325,318 describes an incremental angle encoder containing means for optional adjustment of an absolute zero point or reference point. These means consist of a reducing gear which is coupled to the angle encoder shaft on the drive side and on the driven side to a disc comprising an opto-electronically scannable bore or light reflection mark. The disc constitutes a gear wheel which is coupled to the reducing gear by means of a sliding clutch and which can be externally adjusted using a tooth wrench provided with a pinion. The absolute zero point thereby can be adjusted for the incremental angle transmitter.

In this arrangement the disc of the angle encoder, the reducing gear which is constructed as a planetary gear, and the gear wheel are axially series arranged. Thus there results an undesirably great overall length which is a bar to the accommodation in a flat housing.

German Patent Publication No. 2,659,760 shows an arrangement for indicating the angular position of a rotatable member provided with a shaft, for example, the printing head of an office machine. Therein the rotary movement of the shaft which constitutes the input shaft of the arrangement is transmitted to a second shaft by means of a gear wheel transmission in a speed changing manner. A drum containing a photoelectrically operating incremental angle encoder is seated on the second shaft. In this manner only a partial revolution of the input shaft corresponds to a complete revolution of the drum in correspondence with the transmission ratio. Therefore, small angle increments of the input shaft are covered by relatively coarse angle increments of the drum. In order to obtain a zero point which corresponds to a predetermined position of the input shaft, a second drum is arranged within the drum. The second drum is rotatably journalled at the second shaft and coupled thereto via a reducing gear arranged within the interior of the second drum. The reduction is selected such that the second drum is rotated through the same angle as the input shaft. The second drum is also photoelectrically scanned and supplies the zero point.

Both the arrangements according to German Patent Publication Nos. 3,325,318 and 2,659,760 constitute incremental angle transmitters which are driven through a number of revolutions either directly as according to German Patent Publication No. 3,325,318 or via a speed changing transmission as according to German Patent Publication No. 2,659,760. The members driven via a reducing gear do not constitute angle transmitters but only supply a zero point. These arrangements are not concerned with an angle transmitter containing a rotor which cooperates with a stator through a limited angular range for generating an output signal dependent on the rotational angle, and with the accommodation of such angle transmitter, together with the reducing gear in a flat housing.

DISCLOSURE OF INVENTION

The invention is based on the object of constructing an angle transmitter of the initially mentioned type such that its axial dimensions become the smallest possible dimensions.

In accordance with the invention this object is achieved in that (f) the input shaft is journalled in said flat housing,
(g) the rotor is rotatably supported at the input shaft and
(h) the reducing gear is arranged within the flat housing in an annular space formed between the rotor and the input shaft.

In this manner a space utilized for receiving the reducing gear which is present in the flat housing, in any case. It is not required that still further housing including an input shaft and reducing gear be attached to the flat housing.

In contrast to the described known arrangement the input shaft which is rotatable through at least 360° and coupled to the rotor via the reducing gear, is journalled as such in the recited flat housing and not a shaft which is rigidly coupled to the rotor and practically rotated only through a limited angle. Contrary to German Patent Publication No. 3,212,149 the rotor is not rigidly coupled to a shaft but rotatably supported at the input shaft. The reducing gear is not seated in a separate housing, but within the flat housing which also contains the stator and the rotor. There results thus a highly space-saving angle transmitter having small axial dimensions.

Constructional realizations of the invention are the subjects of the dependent claims.

BRIEF DESCRIPTION OF DRAWINGS

In the following, an exemplary embodiment of the invention is explained in more detail with reference to the associated drawings:

FIG. 1 shows in a broken-off manner a section through an angle transmitter of the instant type.

FIG. 2 is a schematic top plan view of the angle transmitter.

PREFERRED MODES FOR CARRYING OUT THE INVENTION

Figure 3:
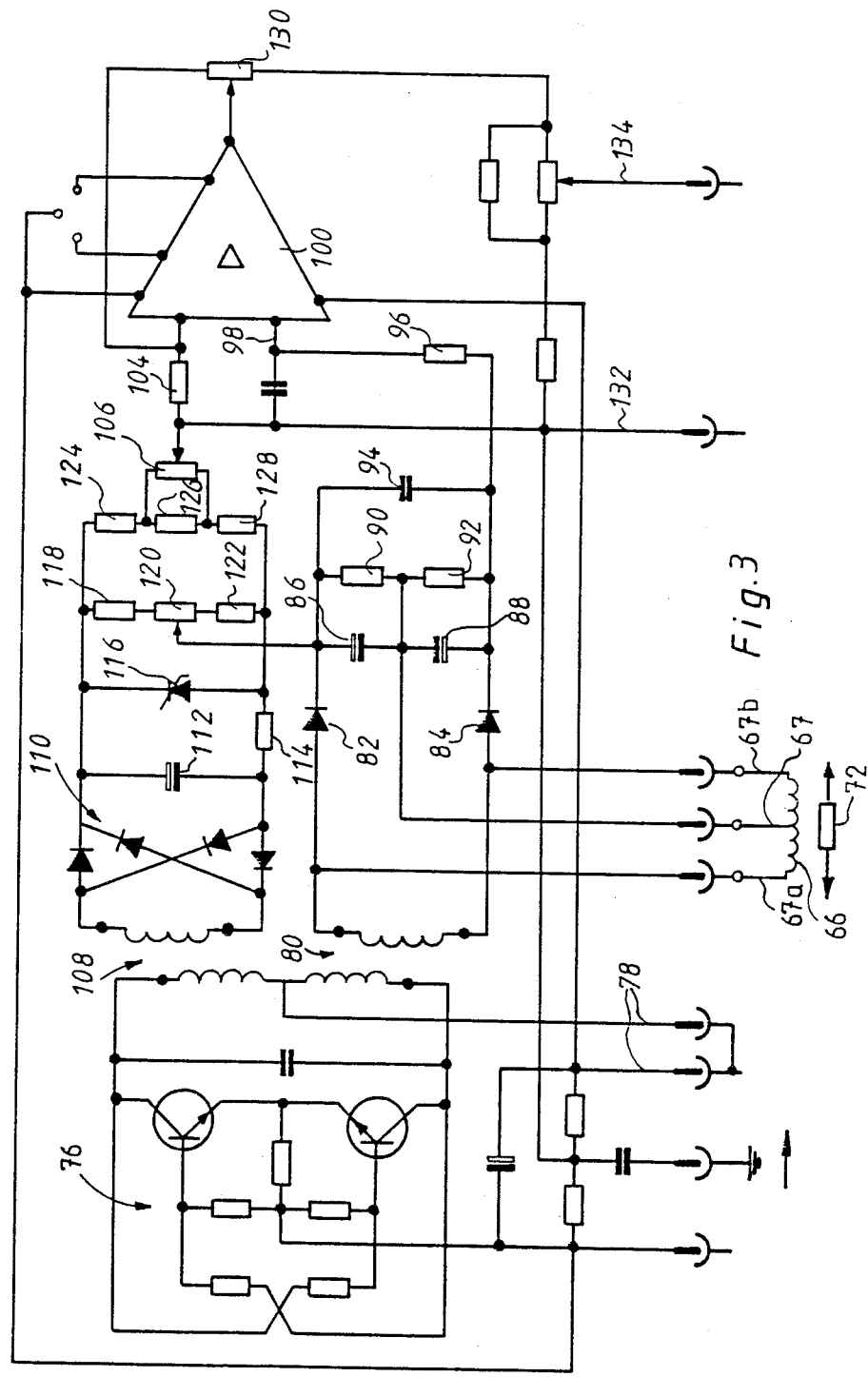
FIG. 3 shows the related circuit diagram.

The angle transmitter contains a flat housing 10. A stator 12 is arranged in the flat housing 10. Furthermore, a rotor 14 is rotatably supported relative to the stator 12 in the housing 10. The rotor 14 cooperates with the stator 12 through a limited angular range for generating an output signal which is dependent upon the rotational angle. An input shaft 16 is coupled to the rotor 14 via a reducing gear 18.

The input shaft 16 is journalled in the recited flat housing 10. The rotor 14 is rotatably supported at the input shaft 16. The reducing gear 18 is arranged within the flat housing 10 in an annular space 20 formed between the rotor 14 and the input shaft 16. The reducing gear 18 contains an external toothing 22 at the input shaft 16 as well as an internal toothing 24 at the rotor 14 concentric relative to the input shaft 16 and gear means 26 spaced therefrom and rotatably journalled in the housing 10 and which gear means 26 mesh with the external housing 22 of the input shaft 16, on the one hand, and with the internal toothing 24 of the rotor 14, on the other hand.

For play-free transmission of the rotary movement, the gear means 26 comprises a first gear wheel 28 and a second gear wheel 30 similar thereto and which gear wheels are rotatably supported at an axle 32 fixed relative to the housing. The first and second gear wheels 28 and 30 are interconnected by (FIG. 1) elastic members such that their teeth are slightly angularly offset from each other in an idle position. The gear wheels, then, can be engaged with the external toothing 22 of the input shaft 16 and with biasing of the elastic members such that the flank of one tooth of the first gear wheel 22 resiliently engages a related tooth of the external toothing 22 and the opposite flank of the corresponding tooth of the second 30 is resiliently engaged with the adjacent tooth of the external toothing 22. In this manner the transmission of the rotational movement of the input shaft 16 to the first and second gear wheels 28 and 30 is effected free of play. The gear means 26 further contain a third gear wheel 34 which is also rotatably supported at the axle 32 which is fixed relative to the housing. The third gear wheel 34 is free from the external toothing 22 of the input shaft 16 and thus in engagement with this external toothing 22. The third gear wheel 34 is connected with the adjacent second gear wheel 30 by means of elastic members 36 such that their teeth are slightly angularly offset from each other in an idle position. The second and third gear wheels 32 and 34 mesh with the internal toothing 24 of the rotor 14 and freedom from play is generated again in the described manner by biassing the elastic members 36.

The rotor 14 contains a hub 38 which is rotatably supported at the input shaft 16 adjacent the external toothing 22 of the input shaft 16 by means of two rolling bearings 40 and 42. An annular disc-shaped central portion 44 adjoins the hub 38. of the hub 38, which end is adjacent the external toothing 22 and thus at the lower end of the hub 38 in FIG. 1. The central portion 44 is followed along its circumference and on the side remote from the hub 38, by a circumferential portion 46 having a basic cylindrical shape. The internal toothing 24 is provided at this circumferential portion 46 on the inside thereof. The gear means 26 protrude into the annular space 20 bounded by the circumferential portion 46, the central portion 44 and the input shaft 16.

The input shaft 16 is journalled in rolling bearings 48 and 50 provided in related cover members 52 and 54 of the housing 10. The cover member 52 therein comprises a collar 66 in which the bearing 48 is seated. The cover member 54 comprises along its outer rim a collar 58 at which the stator 12 is retained. The axle 32 is also seated in the cover member 54. The hub 38 of the rotor 14 and the external toothing 22 of the input shaft 16 are arranged at the input shaft 16 between the rolling bearings 48 and 50. A further annular space 60 is formed around the hub 38 between the central portion 44 of the rotor 14 and the cover member 52 of the housing 10. Signal processing electronic components of a circuit arrangement delivering the angle signal are arranged at an annular printed circuit board 62 within this annular space 60. The housing 10 is provided with a magnetic shield 64 made of mu-metal.

In this manner not only the gear 18 is accommodated by the flat housing 10. The housing 10 also contains the components of the signal processing circuit.

In the illustrated embodiment the stator 12 comprises a coil 66 which is wound along a circular arc and contains a central tap 67 and coil ends 67a, 67b and an at least partially ferromagnetic core 68. The rotor 14 comprises an at least partially ferromagnetic armature which internally extends around the coil 66 in a manner such that only the stray field is affected. There is provided a circuit arrangement which includes components mounted at the printed circuit board 62 and also responds to changes in the inductances of the coil members formed on both sides of the central tap, for generating an angle signal. The core 68 is formed by a ring 70 of non-magnetic material, for example, aluminium and of substantially rectangular cross-section. A strip 72 of ferromagnetic material is inserted as an armature into the ring 70 on the inside thereof. The rotor 14 comprises the circumferential portion 46 which is rotationally movable closely within the coil 66 and a strip 74 of ferromagnetic material is inserted in the circumferential portion 46 into a part of the circumference of the outer surface facing the coil 66. The rotor 14 is arranged in the housing 10 for rotation through an angle exceeding 360°. There are thus not provided any stops which may give reason to damage or maladjustment of the angle transmitter.

The associated circuit is illustrated in FIG. 3 and corresponds to the circuit according to the German Patent Publication No. 3,212,149.

An oscillator 76 powered by a d.c. supply voltage at terminals 78, delivers an a.c. voltage at a transformer 80. This a.c. voltage produces currents flowing through both halves of the coil 66. These currents depend upon the inductances of the two halves and thus upon the position of the armature 72. The currents are rectified by related diodes 82 and 84 and charge related capacitors 86 and 88. Associated ohmic resistors 90 and 92 are connected parallel to the capacitors 86 and 88. The capicators 86 and 88 are connected with their voltages in opposition to each other. When the inductances in the two halves of the coil 66 are equal, the capacitors 86 and 88 are symmetrically charged and the resulting d.c. voltage is zero. In the presence of an asymmetry, the capacitor voltages also become asymmetric. There appears then a resulting d.c. voltage of either positive or negative sign depending upon the direction of the angular deflection. This d.c. voltage is smoothed by means of a capacitor 94.

The d.c. voltage is applied to an input 98 of an operational amplifier 100 via a resistor 96. At an other input 102 of the operational amplifier 100 there is supplied via a resistor 104 a voltage tapped from a potentiometer 106.

The supply voltage for the potentiometer 106 is obtained via a transformer 108 which is powered by the oscillator 70, and a rectifier bridge 110. The rectified a.c. voltage is smoothed by means of a capacitor 112. The obtained d.c. voltage is stabilized by means of a stabilizer circuit including a resistor 114 and a Zener diode 116.

A chain containing a resistor 118, a potentiometer 120 and a resistor 122 is connected to the stabilized voltage. The slider of the potentiometer 120 is connected with one side of the capacitor 94. There is thus provided a reference point for the voltages applied to the operational amplifier. A chain containing three resistors 124, 126, 128 is connected parallel to the chain 118, 120, 122. The potentiometer 106 is connected to the central resistor 126.

A potentiometer 130 has a slider connected to the output of the operational amplifier 100 and permits adjustment of the negative feedback and thus of the gain. The output voltage is tapped between terminals 132 and 134.

I claim:

1. Angle transmitter containing
   (a) a flat housing (10),
   (b) a stator (12) arranged in the flat housing (10),
   (c) a rotor (14) rotatably supported relative to the stator (12) in the housing (10) and cooperating with the stator (12) in the housing (10) and cooperating with the stator (12) through a limited angular range for producing an output signal dependent upon the rotational angle,
   (d) an input shaft (16) and
   (e) a reducing gear (18) by means of which the input shaft (16) is coupled to the rotor (14),
   characterized in that
   (f) the input shaft (16) is journalled in said flat housing (10),
   (g) the rotor (14) is rotatably supported on the input shaft (16), the rotor comprising a hub (38) rotatably supported at the input shaft (16) adjacent the external toothing (22) of the input shaft (16) by means of two rolling bearings (40, 42), as well as an annular, disc-shaped central portion (44) adjoining the end of the hub (38) which is adjacent the external toothing (22), the rotor further including a circumferential portion (46) of basic cylindrical shape and which adjoins the central portion (44) along the circumference thereof on the side remote from the hub (38) and comprises the internal toothing,
   (h) the reducing gear (18) is arranged within the flat housing (10) in an annular space (20) formed between the rotor (14) and the input shaft (16),
   (i) the reducing gear containing an external toothing (22) at the input shaft (14) as well as an internal toothing (24) at the rotor (14) concentric relative to the input shaft (16) and spaced therefrom and
   (j) in the housing (10), rotatably supported gear means (26) mesh with the external toothing (22) of the input shaft (16), on the one hand, and the internal toothing (24) of the rotor (14), on the other hand, the gear means protruding into the annular space (20) bounded by the circumferential portion (46), the central portion (44) and the input shaft (16).

2. Angle transmitter according to claim 1, characterized in that the housing (10) is provided with a magnetic shield (64) made of mu-metal.

3. Angle transmitter according to claim 1, characterized in that
   (a) the gear means (26) comprise for play-free transmission of the rotational movement a first and a second gear wheel (28, 30) similar thereto which are rotatably supported at an axle (32) fixed relative to the housing and interconnected by means of elastic members such that their teeth are slightly angularly offset from each other in an idle position
   (b) the first and the second gear wheel (28, 30) are in engagement with the external toothing (22) of the input shaft (16),
   (c) the gear means (26) further comprise a third gear wheel (34) which is also rotatably supported on the axle (32) fixed relative to the housing, free of the external toothing (22) of the input shaft (16) and connected with the adjacent second gear wheel (30) by means of elastic members (36) such that their teeth are slightly angularly offset from each other in an idle position, and
   (d) the second and the third gear wheel (30, 34) are in engagement with the internal toothing (24) of the rotor (14).

4. Angle transmitter according to claim 1, characterized in that (a) the stator (12) comprises a coil (68) wound along a circular arc and containing a central tap and an at least partially ferromagnetic core (66),
(b) the rotor (14) comprises an arcuately shaped, at least partially ferromagnetic armature externally extending around the coil (68) in a manner only affecting the stray field, and
(c) a circuit arrangement is provided which responds to inductance changes of the coil portions formed on both sides of the central tap, for generating an angle signal.

5. Angle transmitter according to claim 1, characterized in that the input shaft (16) is journalled in rolling bearings (48, 50) provided in cover members (52, 54) of the housing (10), the hub (38) of the rotor (14) and the external toothing (22) of the input shaft (16) being arranged at the input shaft (16) between these rolling bearings (48, 50).

6. Angle transmitter according to claim 5, characterized in that signal processing electronic components are arranged in an annular space (60) which is formed around the hub (38) between the central portion (44) of the rotor (14) and the cover member (52) of the housing (10).

7. Angle transmitter according to claim 4, characterized in that
(a) the core (66) is formed by a ring (70) which is made of non-magnetic material and has substantially rectangular cross-section and into which there is inserted on the inside a strip (72) of ferromagnetic material, and
(b) the rotor (14) comprises a circumferential portion (46) rotatably movable closely within the coil (68) and having an outer surface facing the coil and having inserted therein in part of its circumference a strip (74) of ferromagnetic material.

8. Angle transmitter according to claim 7, characterized in that the rotor (14) is arranged in the housing (10) for rotation beyond 360°.

* * * * *